US012407117B2

(12) United States Patent
Sugiyama et al.

(10) Patent No.: US 12,407,117 B2
(45) Date of Patent: Sep. 2, 2025

(54) CONNECTOR FOR SHIELDED ELECTRIC WIRE, AND WIRE HARNESS

(71) Applicant: Yazaki Corporation, Tokyo (JP)

(72) Inventors: Daisuke Sugiyama, Makinohara (JP); Masanobu Higashitani, Makinohara (JP); Tomoaki Hayakawa, Makinohara (JP); Yasukazu Chikamatsu, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 299 days.

(21) Appl. No.: 18/446,979

(22) Filed: Aug. 9, 2023

(65) Prior Publication Data

US 2024/0088581 A1 Mar. 14, 2024

(30) Foreign Application Priority Data

Sep. 14, 2022 (JP) ................................ 2022-146267

(51) Int. Cl.
*H01R 9/05* (2006.01)
*H01B 7/00* (2006.01)

(52) U.S. Cl.
CPC ......... *H01R 9/0518* (2013.01); *H01B 7/0045* (2013.01); *H01R 2201/26* (2013.01)

(58) Field of Classification Search
CPC .............. H01R 2201/26; H01R 13/748; H01R 13/5202; H01R 13/5205; H01R 13/6592; H01R 13/6596; H01R 13/648; H01R 11/12; H01R 13/02; H01R 13/52; H01R 13/6581
See application file for complete search history.

(56) References Cited

FOREIGN PATENT DOCUMENTS

| | | | | | |
|---|---|---|---|---|---|
| CN | 107887746 A | * | 4/2018 | | H01R 13/5208 |
| CN | 106911045 B | * | 6/2021 | | H01R 11/11 |
| JP | 2019-9010 A | | 1/2019 | | |

* cited by examiner

*Primary Examiner* — Jean F Duverne
(74) *Attorney, Agent, or Firm* — Sughrue Mion, PLLC

(57) ABSTRACT

A connector for a shielded electric wire includes: a shield terminal connected to a braid on one end side thereof and grounding the braid by contact at a leaf spring on the other end side thereof; a first packing (sealing member) that seals between a housing and an object inserted into a through hole from an inner surface of the housing to an inner surface of the through hole; and a support member that is a resin ring exteriorly mounted on the shield terminal to be adjacent to the leaf spring and disposed inside the through hole in such a manner that an outer circumferential edge thereof is in contact with the inner surface of the through hole, thereby suppressing an offset of a central axis of the shield terminal with respect to a central axis of the through hole.

12 Claims, 5 Drawing Sheets

CONNECTOR FOR SHIELDED ELECTRIC WIRE, AND WIRE HARNESS

BACKGROUND

Technical Field

The present invention relates to a connector for a shielded electric wire for connecting a shielded electric wire therethrough, and a wire harness with the connector provided at an end thereof.

Related Art

Conventionally, in many cases, a connector for a shielded electric wire for connecting a shielded electric wire therethrough has a grounding structure for grounding a braid of the shielded electric wire to a metal panel constituting a connection target (for example, see JP 2019-9010 A). In the connector described in JP 2019-9010 A, a housing fixed to the metal panel of the connection target is made of metal, and the braid of the shielded electric wire is grounded to the metal panel via the metal housing.

Here, in order to make it easy to manufacture housings, many housings are made of resins, and the housings made of resins may be adopted for certain connectors. It is usual that such a type of connector includes a shield terminal that grounds a braid to a metal panel of a connection target. As the shield terminal, there has been known a shield terminal formed in a tubular shape, with an end thereof being formed in a leaf spring shape, while being connected to the braid exposed from the shielded electric wire to cover the braid. In such a shield terminal, the leaf spring portion is in spring contact with an inner surface of a through hole for inserting a wire provided in the metal panel of the connection target, thereby grounding the braid to the metal panel.

CITATION LIST

Patent Literature

Patent Document 1: JP 2019-9010 A

SUMMARY

Here, the shield terminal having the leaf spring structure described above is preferably in spring contact with the inner surface of the through hole with uniform contact pressure in a circumferential direction. To this end, it is preferable that the connector is fixed to the metal panel of the connection target in such a manner that a central axis of the tubular shield terminal does not deviate from a central axis of the through hole. However, the connector may be fixed to the metal panel of the connection target in a biased state or in an inclined state due to an influence of an error that occurs when a component is manufactured or the like. In such a case, an axis of the shield terminal may be offset with respect to the through hole, resulting in non-uniformity in contact pressure of the shield terminal in the circumferential direction with respect to the inner surface of the through hole, which may cause an increase ground resistance of the braid.

Therefore, focusing on the above-described problem, an object of the present invention is to provide a connector capable of suppressing non-uniformity in contact pressure of a shield terminal in a circumferential direction with respect to an inner surface of a through hole. Another object of the present invention is to provide a wire harness with such a connector for a shielded electric wire provided at an end thereof.

In order to solve the above-described problem, a connector for a shielded electric wire includes: a housing that is a tubular resin member configured to allow a shielded electric wire electromagnetically shielded by a braid to be inserted through the resin member, and is configured to be fixed to a connection target in such a manner that one end opening thereof communicates with a through hole provided in a metal panel constituting the connection target, and one end portion of the shielded electric wire extending from the one end opening passes through the through hole;

- a connector terminal provided at the one end portion of the shielded electric wire and configured to be connected to a terminal portion of the connection target;
- a shield terminal that is a metal tube configured to be externally mounted on the shielded electric wire, the shield terminal having one end side configured to be connected to the braid and another end side folded outward to form a leaf spring that generates a biasing force in a radially expanding direction, the leaf spring configured to come into contact with an inner surface of the through hole of the metal panel so as to press the inner surface of the through hole and to thus ground the braid to the metal panel;
- a sealing member formed of an elastic resin in a tubular shape to seal between the housing and an object inserted in the through hole from an inner surface of the housing to the inner surface of the through hole while avoiding a portion where the inner surface of the through hole and the leaf spring are in contact with each other; and
- a support member that is a resin ring externally mounted on the shield terminal to be adjacent to the leaf spring on a side opposite to the connector terminal, while being sandwiched between the leaf spring and the sealing member, an outer circumferential edge of the support member configured to be disposed inside the through hole in such a manner as to be in contact with the inner surface of the through hole, thereby suppressing an offset of a central axis of the shield terminal with respect to a central axis of the through hole.

In addition, in order to solve the above-described problem, a wire harness includes: the above-described connector; and a shielded electric wire electromagnetically shielded by a braid, the shielded electric wire extending from the housing with the connector terminal being provided at an end thereof.

According to the above-described connector and wire harness, it is possible to suppress non-uniformity in contact pressure of the shield terminal in the circumferential direction with respect to the inner surface of the through hole.

DETAILED DESCRIPTION

Hereinafter, a connector for a shielded electric wire, and a wire harness will be described.

Figure 1:
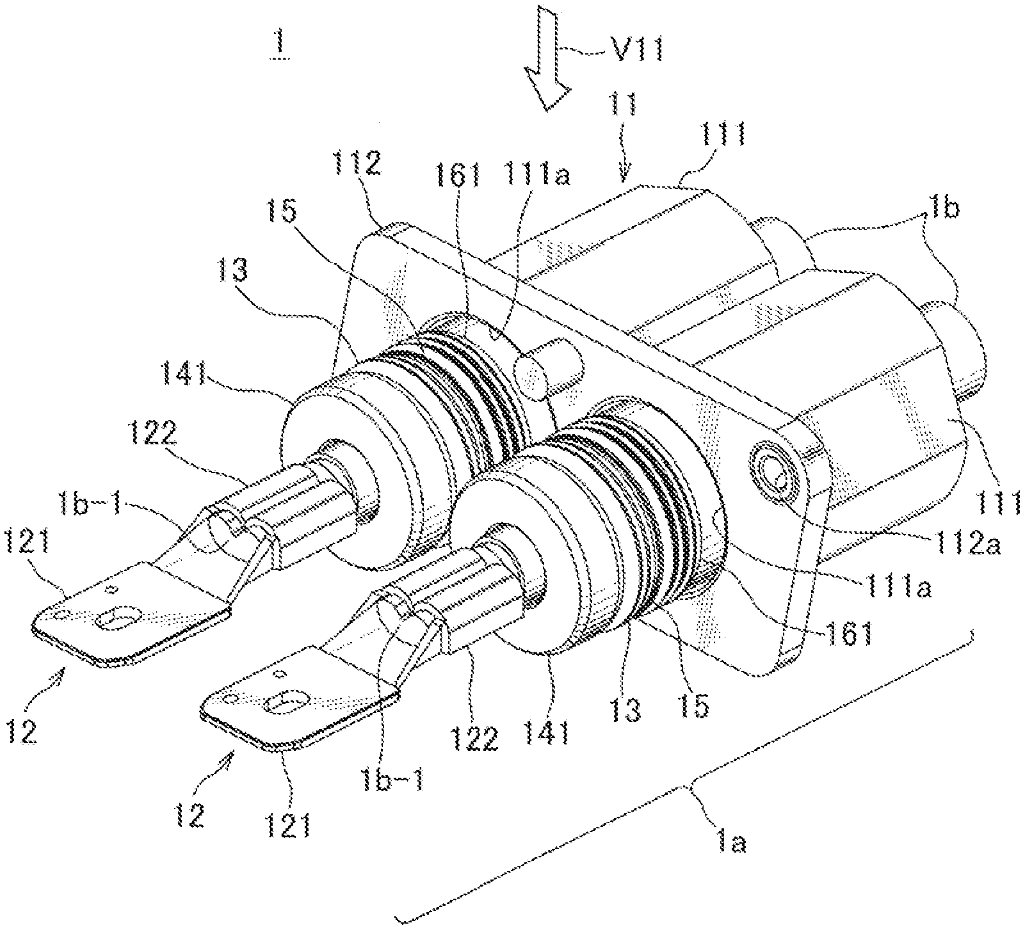
FIG. 1 is a perspective view illustrating a connector for a shielded electric wire and a wire harness according to an embodiment.
Figure 2:
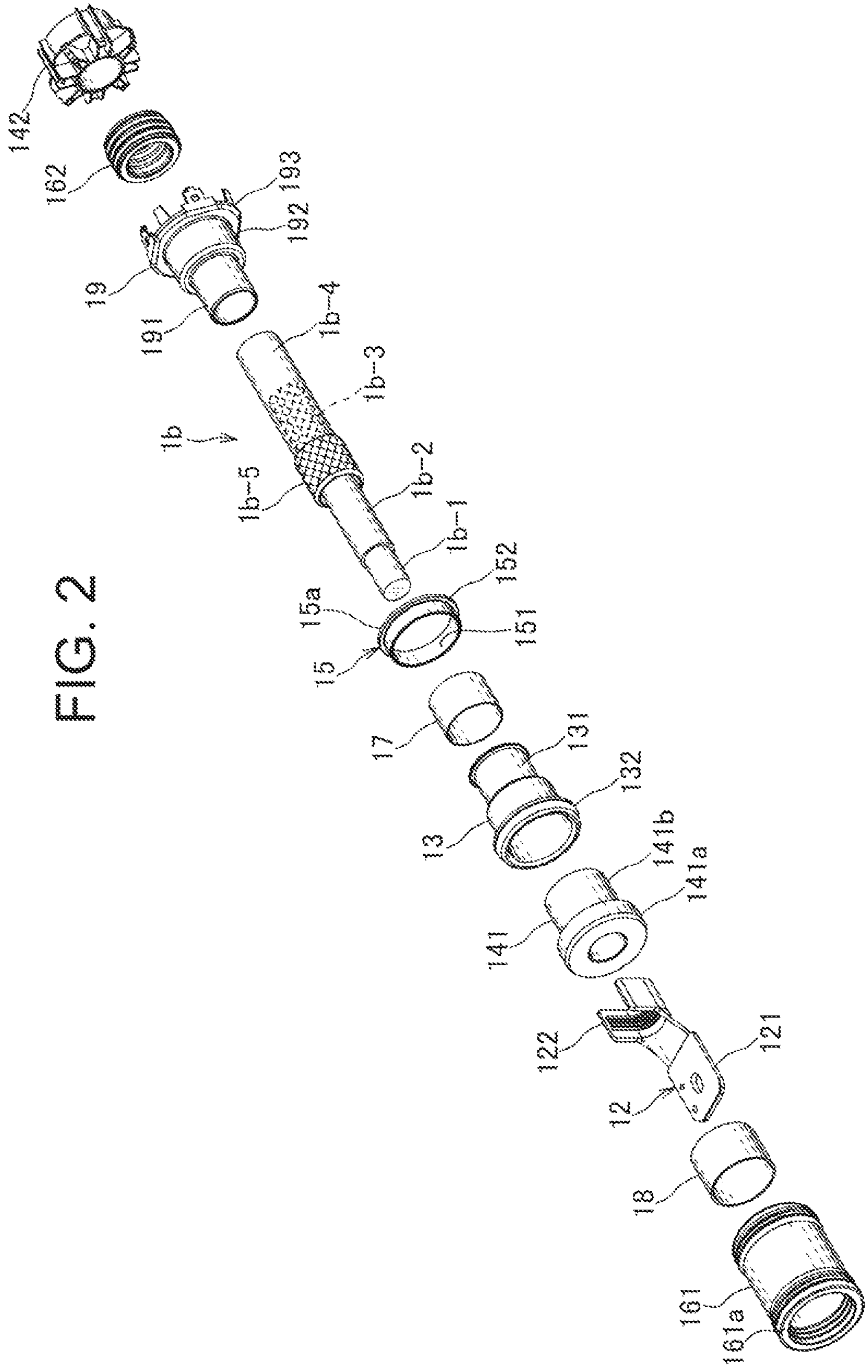
FIG. 2 is an exploded perspective view illustrating a configuration related to one wire in the connector and the wire harness illustrated in FIG. 1.

FIG. 1 is a perspective view illustrating a connector for a shielded electric wire, and a wire harness according to an embodiment. FIG. 2 is an exploded perspective view illustrating a configuration related to one wire in the connector and the wire harness illustrated in FIG. 1.

The wire harness 1 illustrated in FIG. 1 is routed in an automobile or the like, and a connector 1*a* for a shielded electric wire is provided therein at end portions of two shielded electric wires 1*b*.

The connector 1*a* is a two-terminal straight connector, and has a structure in which the two shielded electric wires 1*b* are inserted into a housing 11 formed of a resin in a double-tube type, and a connector terminal 12 is connected to an end of each shielded electric wire 1*b*. Here, the shielded electric wire 1*b* extending from the connector 1*a* and constituting the wire harness 1 is a wire electromagnetically shielded by a braid 1*b*-3 as illustrated in FIG. 2. The shielded electric wire 1*b* is formed in such a manner that a core wire 1*b*-1 is covered with a first sheath 1*b*-2, the first sheath 1*b*-2 is covered with a shielding braid 1*b*-3, and the braid 1*b*-3 is covered with a second sheath 1*b*-4. At the end of each shielded electric wire 1*b*, the connector terminal 12 is connected in a crimped manner to the core wire 1*b*-1 exposed after passing through the housing 11. In addition, the braid 1*b*-3 is exposed and folded outward at a position slightly away from the connector terminal 12 toward the housing 11. Then, the folded portion 1*b*-5 is connected to a shield terminal 13 for grounding the braid 1*b*-3 to a metal panel which is the ground on the connection target side.

In addition to the housing 11, the connector terminal 12, and the shield terminal 13 described above in outline, the connector 1*a* includes the following members. That is, the connector 1*a* includes a front holder 141, a rear holder 142, a support member 15, a first packing 161 (sealing member), a second packing 162, a shield ring 17, a protective material 18, and a shield sleeve 19. Hereinafter, these members will be described with reference to FIGS. 3 to 5.

Figure 3:
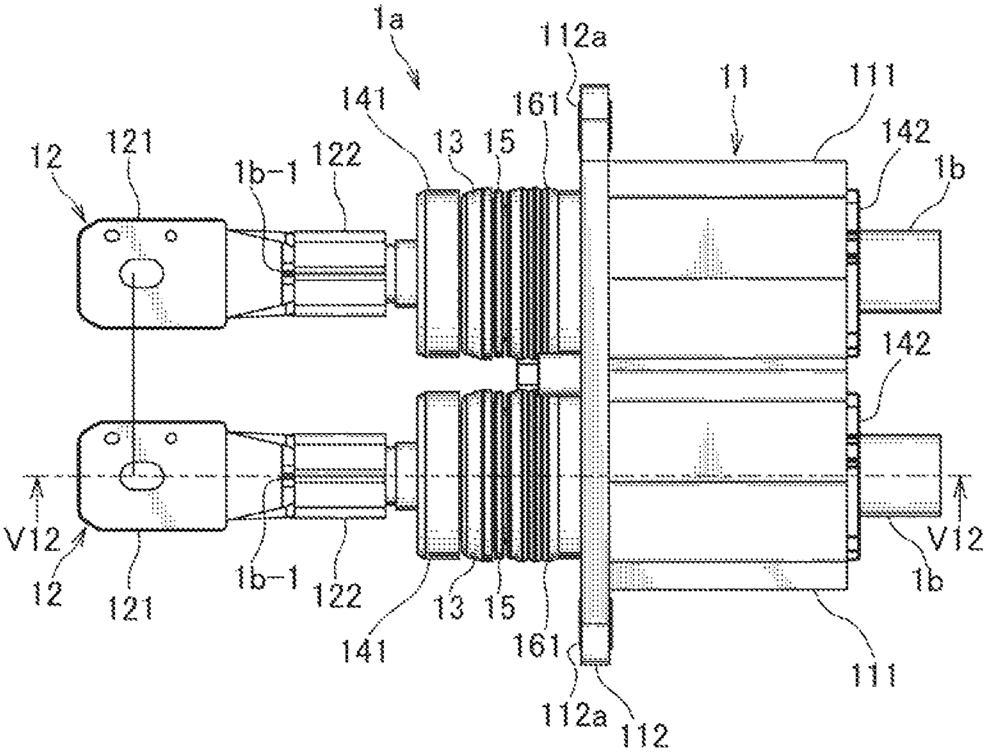
FIG. 3 is a plan view of the connector illustrated in FIG. 1 as viewed from a direction of arrow V11 of FIG. 1.
Figure 4:
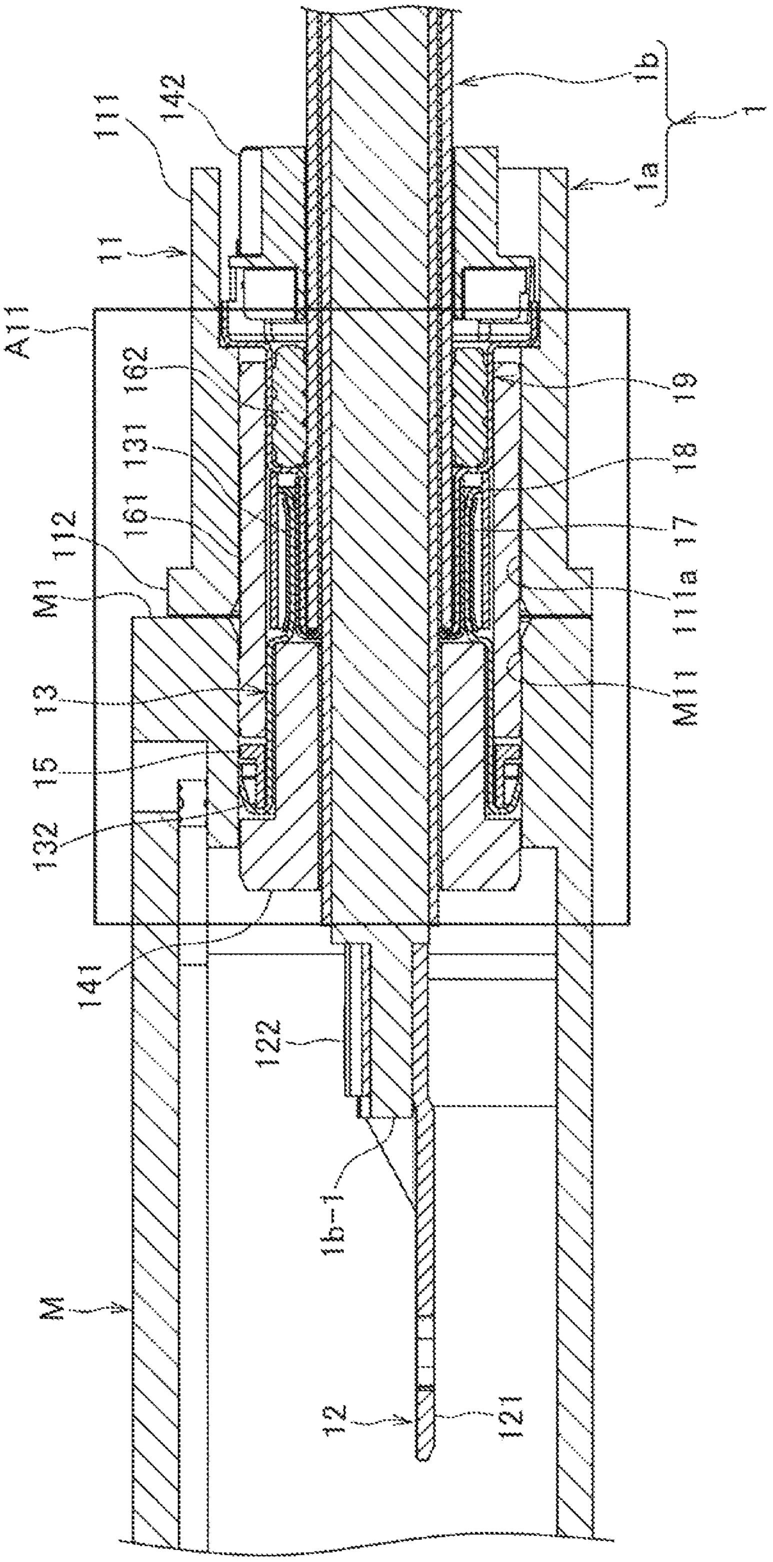
FIG. 4 is a cross-sectional view illustrating a cross section taken along line V12-V12 of FIG. 3 in the connector illustrated in FIG. 3.
Figure 5:
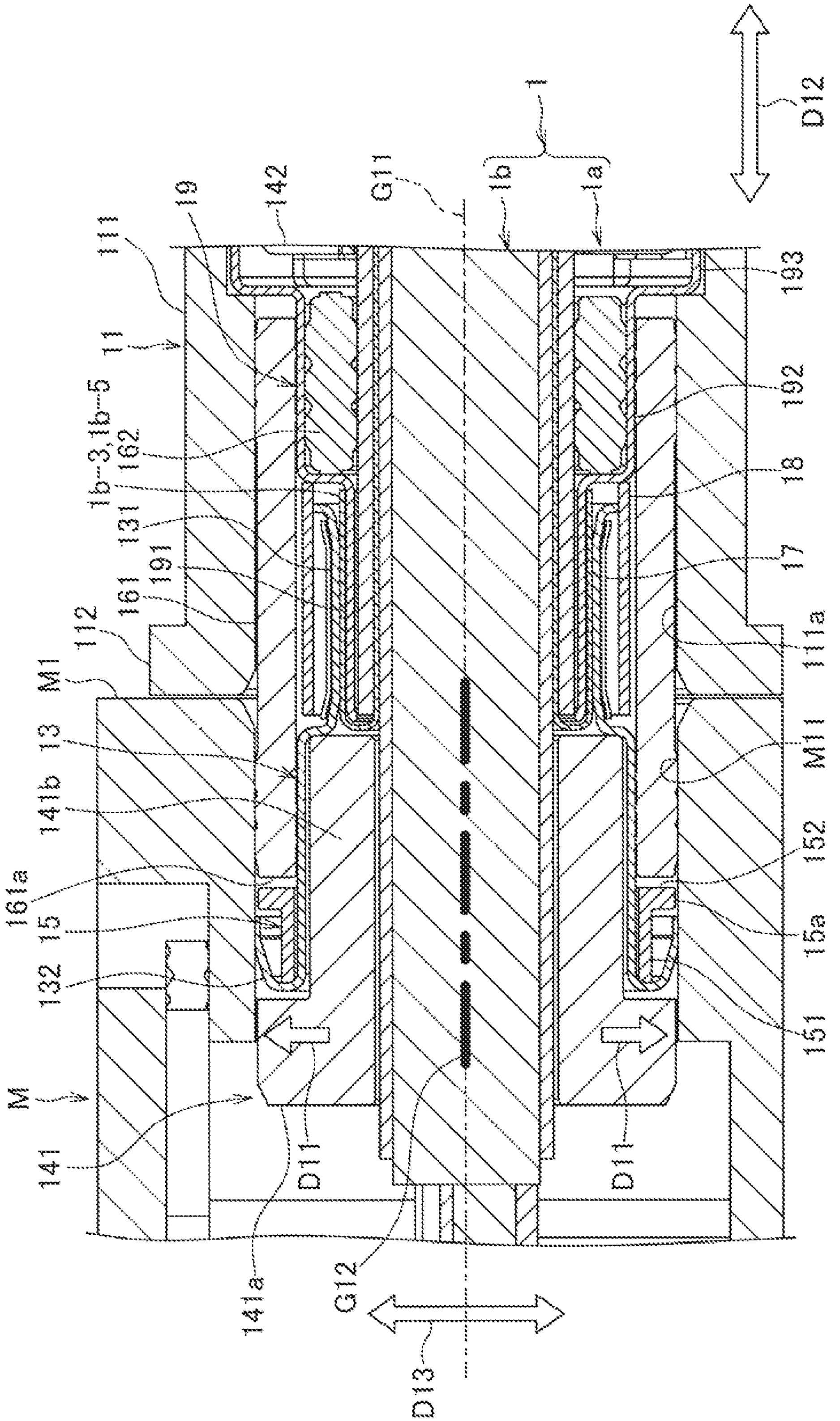
FIG. 5 is an enlarged view of area A11 of FIG. 4 in the cross section illustrated in FIG. 4.

FIG. 3 is a plan view of the connector illustrated in FIG. 1 as viewed from a direction of arrow V11 of FIG. 1, and FIG. 4 is a cross-sectional view illustrating a cross section taken along line V12-V12 of FIG. 3 in the connector illustrated in FIG. 3. FIG. 5 is an enlarged view of area A11 of FIG. 4 in the cross section illustrated in FIG. 4. FIGS. 4 and 5 illustrate cross sections of a connection target M of the connector 1*a* of the present embodiment and a metal panel M1 to which the connector 1*a* is fixed while constituting the connection target M.

As described above, the housing 11 is a double-tube resin member into which the shielded electric wires 1*b* are inserted. The housing 11 is fixed to the connection target M in such a manner that one end opening 111*a* thereof communicates with a through hole M11 provided in the metal panel M1 of the connection target M, and one end portion of the shielded electric wire 1*b* extending from the one end opening 111*a* passes through the through hole M11. In addition, the housing 11 includes a pair of tubular main body portions 111 and a flange 112 having a substantially rectangular shape as viewed in front thereof, the flange 112 being formed over the ends of the main body portions 111 on the side where the connector terminals 12 are installed and spreading outward from the ends of the main body portions 111. In addition, each of the shielded electric wires 1*b* is inserted in each of the main body portions 111. That is, the two shielded electric wires 1*b* are inserted in the housing 11. The flange 112 is a portion that is fixed to the metal panel M1 of the connection target M in a surface-pressed manner. The one end openings 111*a* of the pair of main body portions 111 are disposed at the flange 112, and the connector terminal 12 is fixed to the end of the shielded electric wire 1*b* extending from each of the one end openings 111*a*. In addition, the flange 112 has a pair of attachment holes 112*a* formed to penetrate therethrough in a plate thickness direction at diagonal positions as viewed in front thereof. Bolts (not illustrated) are inserted into the attachment holes 112*a*, and the flange 112 is fixed to the metal panel M1 by the bolts, and thereby, the connector 1*a* is connected to the connection target M.

The connector terminal 12 is a terminal metal fitting connected to a terminal portion inside the connection target M, and includes a connecting portion 121 having a flat plate shape and a crimped portion 122 provided at an end of the connecting portion 121 on the housing 11 side. The connecting portion 121 is a portion connected to the terminal portion by bolt fastening. The crimped portion 122 is a portion crimped while having the core wire 1*b*-1 in the exposed state.

The shield terminal 13 is a metal tube externally mounted on the shielded electric wire 1*b*, and a braid-connected portion 131 provided on one end side thereof is sheathed on and connected in a caulked manner to the folded portion 1*b*-5 of the braid 1*b*-3, as will be described later. Then, a leaf spring 132 that generates a biasing force in a radially expanding direction D11 is formed by folding the shield terminal 13 outward on the other end side thereof, and the leaf spring 132 is in contact with an inner surface of the through hole M11 of the metal panel M1 so as to press the inner surface of the though hole M11 and to thus ground the braid 1*b*-3 to the metal panel M1.

The front holder 141 is a tubular member made of a resin. When the side on which the shielded electric wire 1*b* is connected to the connector terminal 12 is defined as a front side and the side opposite to the front side is defined as a rear side, the front holder 141 closes a space between the through hole M11 of the metal panel M1 and the shielded electric wire 1*b* on the front side of the housing 11. The front holder 141 includes a large-diameter portion 141*a* that closes an outlet of the connection target M on an inner side thereof in the through hole M11, and a small-diameter portion 141*b* that is inserted between the inner side of the leaf spring 132 of the shield terminal 13 and the shielded electric wire 1*b*. The small-diameter portion 141*b* supports pressure of the leaf spring 132 against the inner surface of the through hole M11 from a central axis G11 side of the through hole M11.

The rear holder 142 is a tubular member made of a resin, and is a member that closes a space between a rear-side opening of the main body portion 111 of the housing 11 and the shielded electric wire 1*b*.

The support member 15 is a resin ring externally mounted on the shield terminal 13 to be adjacent to the leaf spring 132 on the side opposite to the connector terminal 12. The support member 15 is disposed in such a manner that the leaf spring 132 is sandwiched between the support member 15 and the large-diameter portion 141*a* of the front holder 141 in an axial direction D12, and the support member 15 is sandwiched between the leaf spring 132 and a first packing 161 to be described later. In addition, the support member 15 is disposed in such a manner that the shield terminal 13 is sandwiched between the support member 15 and the small-diameter portion 141*b* of the front holder 141 in a radial direction D13. Also, the support member 15 is disposed inside the through hole M11 in such a manner that an outer circumferential edge 15*a* thereof is in contact with the inner surface of the through hole M11, thereby suppressing an offset of the central axis G12 of the shield terminal 13 with respect to a central axis G11 of the through hole M11 of the metal panel M1.

In the present embodiment, the support member 15 includes a tubular portion 151 inserted into a folded side of the leaf spring 132 of the shield terminal 13, and a flange portion 152 protruding from an opening edge of the tubular portion 151 on the side opposite to the leaf spring 132. By having these portions, the support member 15 has an L-shaped cross section in the axial direction D12, and is in contact with the inner surface of the through hole M11 at the outer circumferential edge 15*a* of the flange portion 152. The support member 15 is disposed in such a manner that the flange portion 152 faces an end 161*a* of the first packing 161 facing the leaf spring 132.

In the present embodiment, the large-diameter portion 141*a* of the front holder 141 is disposed in such a manner that the leaf spring 132 of the shield terminal 13 is sandwiched between the large-diameter portion 141*a* and the support member 15. Together with the outer circumferential edge 15*a* of the support member 15, an outer circumferential surface of the large-diameter portion 141*a* of the front holder 141 is in contact with the inner surface of the through hole M11, thereby contributing to suppressing an offset of the central axis G12 of the shield terminal 13 with respect to the central axis G11 of the through hole M11 of the metal panel M1.

The first packing 161 is a sealing member formed of an elastic resin in a tubular shape to seal between the main body portion 111 and the object inserted in the through hole M11 from an inner surface of the main body portion 111 of the housing 11 to the inner surface of the through hole M11. At this time, the first packing 161 performs sealing while avoiding a portion where the inner surface of the through hole M11 and the leaf spring 132 are in contact with each other.

The second packing 162 is a sealing member formed of an elastic resin in a tubular shape on the rear side of the main body portion 111 of the housing 11 to seal between the inner surface of the main body portion 111 and the shielded electric wire 1*b* together with the first packing 161. The second packing 162 performs sealing in a state where a shield sleeve 19 to be described later is sandwiched between the first packing 161 and the second packing 162. On the rear side, the first packing 161 seals between the inner surface of the main body portion 111 and the shield sleeve 19, and the second packing 162 seals between an inner surface of the shield sleeve 19 and the shielded electric wire 1*b*.

The shield ring 17 is a metal tubular member for connecting the braid-connected portion 131, which is a tubular portion of the shield terminal 13 other than the leaf spring 132, to the folded portion 1*b*-5 of the braid 1*b*-3 in a caulked manner. Here, a braid-connected portion 191 of the shield sleeve 19 is inserted into a portion caulked by the shield ring 17 between the folded portion 1*b*-5 of the braid 1*b*-3 and the second sheath 1*b*-4. The shield ring 17 is externally mounted on a portion where the braid-connected portion 191 of the shield sleeve 19, the folded portion 1*b*-5 of the braid 1*b*-3, and the braid-connected portion 131 of the shield terminal 13 are stacked to caulk that portion by reducing its diameter.

The protective material 18 is a tube member formed of a resin in a tubular shape and interposed between the first packing 161 and the portion caulked by the shield ring 17 to protect the first packing 161 from the caulked portion that is a metal stack.

The shield sleeve 19 is a metal tubular member to be inserted into the rear side of the main body portion 111. As described above, the shield sleeve 19 includes the braid-connected portion 191 which is connected to the folded portion 1*b*-5 of the braid 1*b*-3 in a caulked manner, together with the braid-connected portion 131 of the shield terminal 13, by the shield ring 17. The shield sleeve 19 includes a packing holding portion 192 having a larger diameter than the braid-connected portion 191 for the second packing 162 to be fitted thereinto, and a holder holding portion 193 having a larger diameter than the packing holding portion 192 to hold the rear holder 142.

According to the connector 1*a* and the wire harness 1 described above, the support member 15 made of a resin ring is externally mounted on the shield terminal 13 adjacent to the leaf spring 132. Also, the outer circumferential edge 15*a* of the support member 15 is in contact with the inner surface of the through hole M11 for inserting a wire in the metal panel M1 of the connection target M, thereby suppressing an offset of the central axis G12 of the shield terminal 13 with respect to the central axis G11 of the through hole M11. According to the connector 1*a* described above, by suppressing such an offset, it is possible to suppress non-uniformity of contact pressure of the shield terminal 13 in a circumferential direction with respect to the inner surface of the through hole M11.

Here, in the present embodiment, the support member 15 is a member having an L-shaped cross section in the axial direction D12, with a tubular portion 151 inserted into the folded side of the leaf spring 132 and a flange portion 152. In addition, the support member 15 is in contact with the inner surface of the through hole M11 at the outer circumferential edge 15*a* of the flange portion 152. According to this configuration, since the support member 15 is in contact with the inner surface of the through hole M11 at the outer circumferential edge 15*a* of the flange portion 152, a contact area between the support member 15 and the inner surface of the through hole M11 can be suppressed, thereby easily a clearance between the inner surface of the through hole M and the support member 15.

In the present embodiment, the support member 15 is disposed in such a manner that the flange portion 152 of the support member 15 faces the end 161*a* of the first packing 161. According to this configuration, since the contact between the end 161*a* of the first packing 161 and the support member 15 in the axial direction D12 is surface contact through the flange portion 152, it is possible to easily restrict a movement of the support member 15 in the axial direction D12.

In the present embodiment, the braid-connected portion 131 of the shield terminal 13 is connected to the folded portion 1*b*-5 of the braid 1*b*-3 in a caulked manner through the shield ring 17. According to this configuration, the shield terminal 13 can be firmly connected in the caulked manner to the braid 1*b*-3 of the shielded electric wire 1*b* electrically and mechanically.

In addition, in the present embodiment, the protective material 18 formed of a resin in a tubular shape is interposed between the first packing 161 and the portion caulked by the shield ring 17 to protect the first packing 161 from the caulked portion. According to this configuration, since the first packing 161 is effectively protected from the caulked portion by the protective material 18, the lifespan of the component can be extended.

In the present embodiment, while the leaf spring 132 of the shield terminal 13 is sandwiched between the large-diameter portion 141*a* of the front holder 141 and the support member 15, the outer circumferential surface of the large-diameter portion 141*a* is in contact with the inner surface of the through hole M11 together with the outer circumferential edge 15*a* of the support member 15, thereby contributing to suppressing an offset of the axis. According to this configuration, the front holder 141 further suppresses the offset of the central axis G12 of the shield terminal 13 with respect to the central axis G11 of the through hole M11, making it possible to further suppress the non-uniformity of contact pressure of the shield terminal 13 in the circumferential direction with respect to the inner surface of the through hole M11.

Note that the above-described embodiment merely shows typical forms of the connector and the wire harness. The connector and the wire harness are not limited the above-described embodiment, and various modifications can be made thereto.

For example, the wire harness 1 routed in an automobile or the like is exemplified as an example of a wire harness in the above-described embodiment, but the wire harness is not limited thereto, and the specific location where the wire harness is routed is not limited.

In the above-described embodiment, as an example of a connector, the connector 1*a* that is a two-terminal straight connector is exemplified. However, the connector is not limited thereto, and the specific number of terminals and the like are not limited.

In the above-described embodiment, as an example of a support member, the support member 15 contacting the inner surface of the through hole M11 at the outer circumferential edge 15*a* of the flange portion 152 is exemplified. However, the support member is not limited thereto, and the specific shape, the form of the contact with the inner surface of the through hole and the like are not limited as long as the support member can suppress an offset of the axis by contacting the inner surface of the through hole. According to the support member 15 contacting the inner surface of the through hole M11 at the outer circumferential edge 15*a* of the flange portion 152, a clearance between the inner surface of the through hole M11 and the support member 15 can be easily reduced as described above.

In the present embodiment, as an example of a support member, the support member 15 disposed in such a manner that the flange portion 152 faces the end 161*a* of the first packing 161 is exemplified. However, the support member is not limited thereto, and the relative positional relationship of the support member with the sealing member around the wire and the like can be appropriately set. According to the support member 15 of which the flange portion 152 faces the end 161*a* of the first packing 161, a movement of the support member 15 in the axial direction D12 can be easily restricted as described above.

In addition, in the present embodiment, as an example of a shield terminal, the shield terminal 13 connected in a caulked manner to the folded portion 1*b*-5 of the braid 1*b*-3 through the shield ring 17 is exemplified. However, the shield terminal is not limited thereto, and any form can be adopted as a specific form of connection with the braid. According to the shield terminal 13 connected in a caulked manner to the folded portion 1*b*-5 of the braid 1*b*-3 through the shield ring 17, the shield terminal 13 can be firmly connected to the braid 1*b*-3 as described above.

In addition, in the present embodiment, as an example of a connector, the connector 1*a* in which the protective material 18 is interposed between the first packing 161 and the caulked portion to protect the first packing 161 from the caulked portion is exemplified. However, the connector is not limited thereto, and no protective material may be provided between the caulked portion and the sealing member. As described above, by providing the protective material 18 between the caulked portion and the first packing 161, the lifespan of the component can be extended.

In the present embodiment, as an example of a connector, the connector 1*a* in which a partial portion of the front holder 141 adjacent to the leaf spring 132 of the shield terminal 13 contributes to suppressing an offset of the axis is exemplified. However, the connector is not limited thereto, and the front holder may be away from the inner surface of the through hole in the metal panel, not contributing to suppressing an axial deviation. As described above, since the partial portion of the front holder 141 contributes to suppressing the offset of the axis, it is possible to further suppress the non-uniformity of contact pressure of the shield terminal 13 in the circumferential direction with respect to the inner surface of the through hole M11.

REFERENCE SIGNS LIST

1 Wire harness
1*a* Connector for a shielded electric wire
1*b* Shielded electric wire
1*b*-1 Core wire
1*b*-2 First sheath
1*b*-3 Braid
1*b*-4 Second sheath
1*b*-5 Folded portion
11 Housing
12 Connector terminal
13 Shield terminal
15 Support member
15*a* Outer circumferential edge
17 Shield ring
18 Protective material
19 Shield sleeve
111 Main body portion
111*a* One end opening
121 Connecting portion
122 Crimped portion
131, 191 Braid-connected portion
132 Leaf spring
141 Front holder
141*a* Large-diameter portion
141*b* Small-diameter portion
142 Rear holder
151 Cylindrical portion
152 Flange portion
161 First packing (sealing member)
161*a* End
162 Second packing
192 Packing holding portion
193 Holder holding portion
D11 Radially expanding direction
D12 Axial direction
D13 Radial direction
G11, G12 Central axis M Connection target
M1 Metal panel
M11 Through hole

What is claimed is:

1. A connector for a shielded electric wire comprising:

a housing that is a tubular resin member configured to allow a shielded electric wire electromagnetically shielded by a braid to be inserted through the resin member, and is configured to be fixed to a connection target in such a manner that one end opening thereof communicates with a through hole provided in a metal panel constituting the connection target, and one end portion of the shielded electric wire extending from the one end opening passes through the through hole;

a connector terminal provided at the one end portion of the shielded electric wire and configured to be connected to a terminal portion of the connection target;

a shield terminal that is a metal tube configured to be externally mounted on the shielded electric wire, the shield terminal having one end side configured to be connected to the braid and another end side folded outward to form a leaf spring that generates a biasing force in a radially expanding direction, the leaf spring configured to come into contact with an inner surface of the through hole of the metal panel so as to press the inner surface of the through hole and to thus ground the braid to the metal panel;

a sealing member formed of an elastic resin in a tubular shape to seal between the housing and an object inserted in the through hole from an inner surface of the housing to the inner surface of the through hole while avoiding a portion where the inner surface of the through hole and the leaf spring are in contact with each other; and a support member that is a resin ring externally mounted on the shield terminal to be adjacent to the leaf spring on a side opposite to the connector terminal, while being sandwiched between the leaf spring and the sealing member, an outer circumferential edge of the support member configured to be disposed inside the through hole in such a manner as to be in contact with the inner surface of the through hole, thereby suppressing an offset of a central axis of the shield terminal with respect to a central axis of the through hole.

2. The connector according to claim 1, wherein the support member is a member having an L-shaped cross section in an axial direction, with a tubular portion inserted into a folded side of the leaf spring on the another end side of the shield terminal and a flange portion protruding from an opening edge of the tubular portion on a side opposite to the leaf spring, and is configured to come into contact with the inner surface of the through hole at an outer circumferential edge of the flange portion.

3. The connector according to claim 2, wherein the support member is disposed in such a manner that the flange portion faces an end of the sealing member facing the leaf spring.

4. The connector according to claim 1, wherein the braid of the shielded electric wire is folded outward on a connection end side of the connector terminal, and a tubular portion other than the leaf spring of the shield terminal is connected in a caulked manner to the folded portion of the braid through a metal shield ring.

5. The connector according to claim 4, wherein the sealing member is externally mounted to the caulked portion of the shield terminal with the braid to cover the caulked portion, and a protective material formed of a resin in a tubular shape is interposed between the sealing member and the caulked portion to protect the sealing member from the caulked portion.

6. The connector according to claim 1, further comprising:

a front holder that is configured to close a space between the through hole and the shielded electric wire on a front side of the housing, the front side being a side on which the shielded electric wire is connected to the connector terminal while a side opposite to the front side is defined as a rear side; and a rear holder that is configured to close a space between an opening on the rear side of the housing and the shielded electric wire, wherein the front holder is disposed in such a manner that the leaf spring of the shield terminal is sandwiched between a partial portion of the front holder and the support member, and an outer circumferential surface of the partial portion of the front holder is in contact with the inner surface of the through hole together with the outer circumferential edge of the support member, thereby suppressing the offset.

7. A wire harness comprising:

the connector according to claim 1; and a shielded electric wire electromagnetically shielded by a braid, the shielded electric wire extending from the housing with the connector terminal being provided at an end thereof.

8. A wire harness comprising:

the connector according to claim 2; and a shielded electric wire electromagnetically shielded by a braid, the shielded electric wire extending from the housing with the connector terminal being provided at an end thereof.

9. A wire harness comprising:

the connector according to claim 3; and a shielded electric wire electromagnetically shielded by a braid, the shielded electric wire extending from the housing with the connector terminal being provided at an end thereof.

10. A wire harness comprising:

the connector according to claim 4; and a shielded electric wire electromagnetically shielded by a braid, the shielded electric wire extending from the housing with the connector terminal being provided at an end thereof.

11. A wire harness comprising:

the connector according to claim 5; and a shielded electric wire electromagnetically shielded by a braid, the shielded electric wire extending from the housing with the connector terminal being provided at an end thereof.

12. A wire harness comprising:

the connector according to claim 6; and a shielded electric wire electromagnetically shielded by a braid, the shielded electric wire extending from the housing with the connector terminal being provided at an end thereof.

* * * * *